Sept. 8, 1964            O. A. ENGEL            3,147,654
BEARING SURFACE RECONDITIONING TOOL
Filed July 23, 1962            3 Sheets-Sheet 1
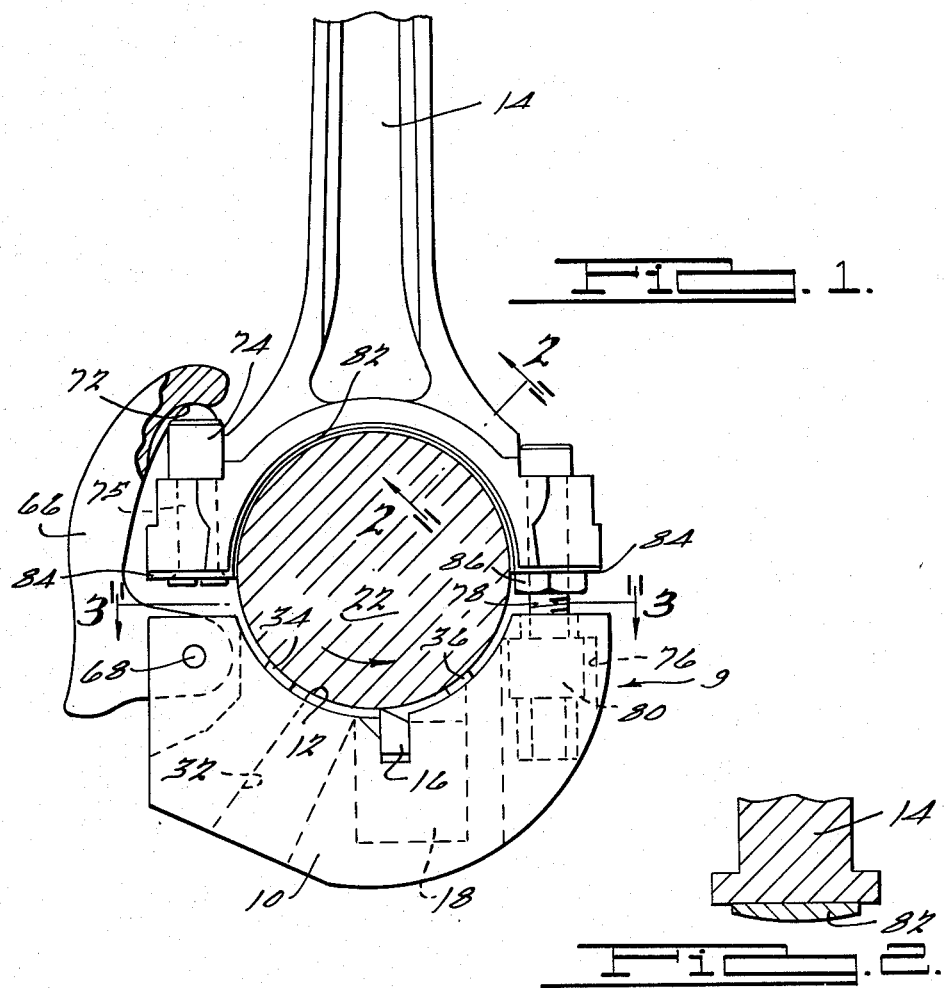
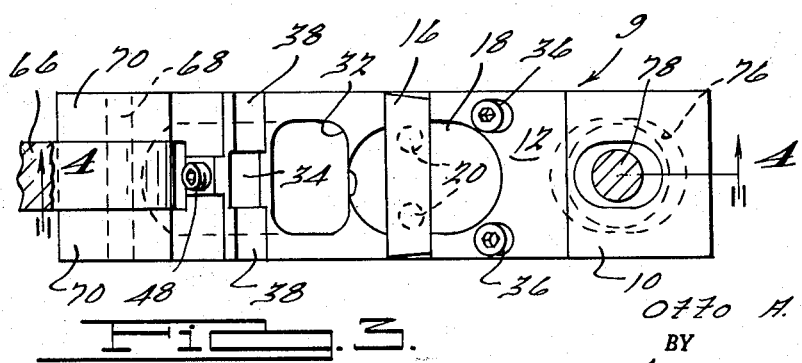
INVENTOR.
Otto A. Engel
BY
Barnes, Dickey & Pierce
ATTORNEYS

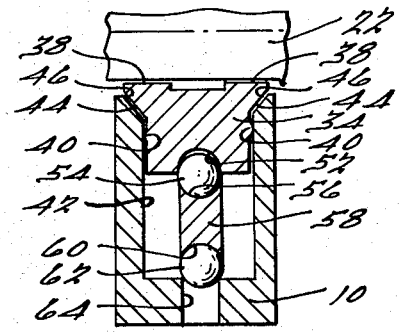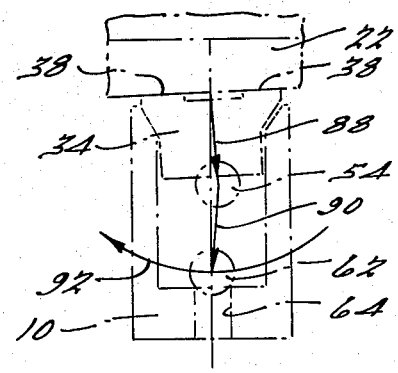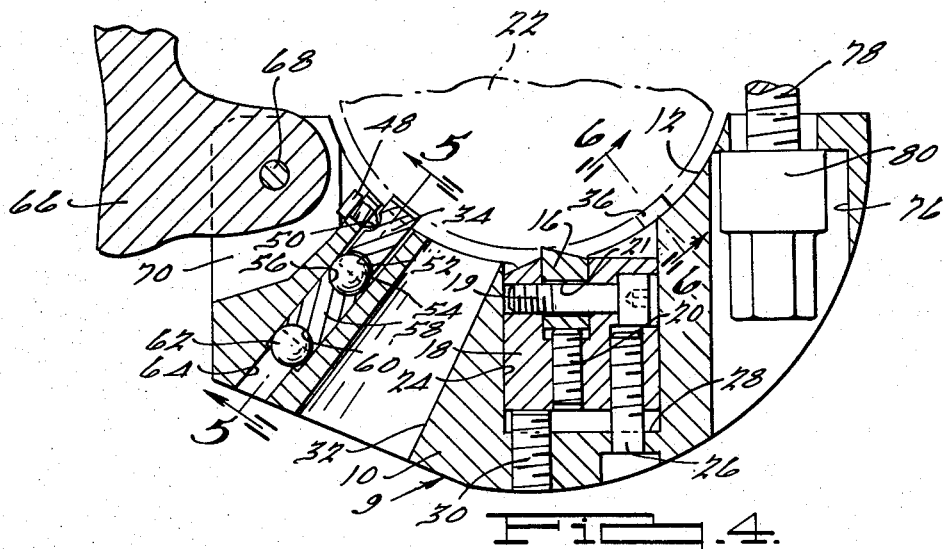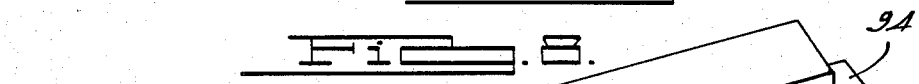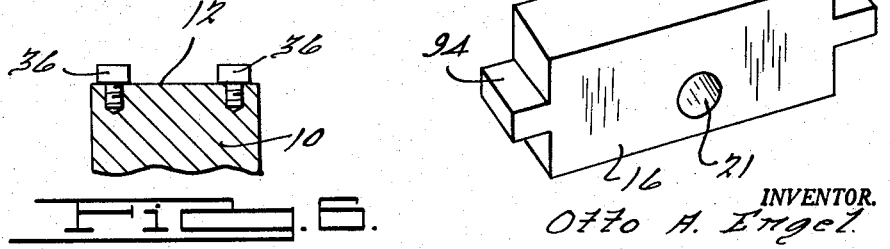

Sept. 8, 1964           O. A. ENGEL           3,147,654
BEARING SURFACE RECONDITIONING TOOL
Filed July 23, 1962           3 Sheets-Sheet 3
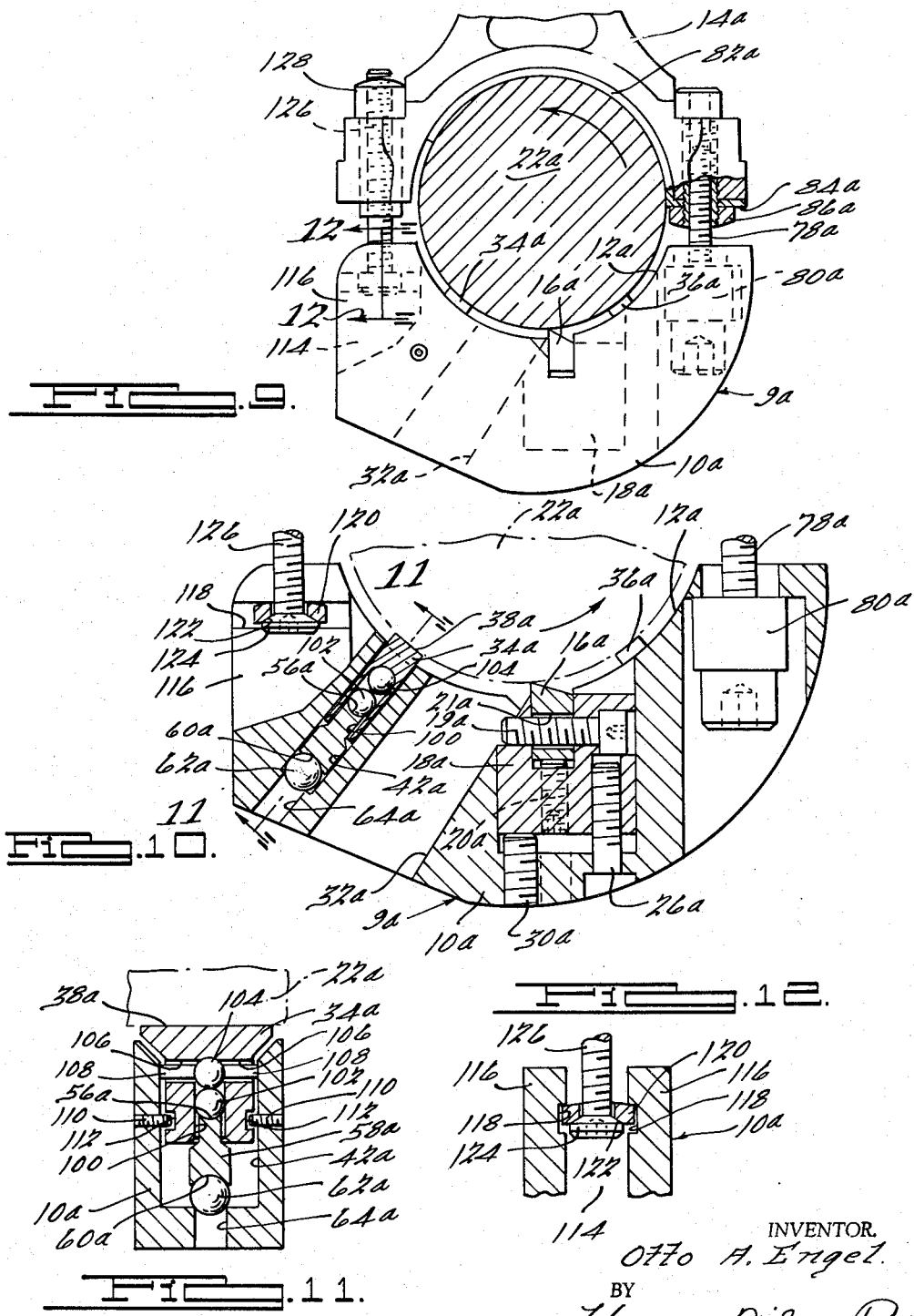
INVENTOR.
Otto A. Engel.
BY Harness, Dickey & Pierce.
ATTORNEYS.

United States Patent Office 3,147,654
Patented Sept. 8, 1964

3,147,654
BEARING SURFACE RECONDITIONING TOOL
Otto A. Engel, 8086 Westwood, Detroit, Mich.
Filed July 23, 1962, Ser. No. 213,843
8 Claims. (Cl. 82—4)

The present invention broadly relates to a bearing surface reconditioning tool which can be advantageously utilized in accurately refinishing worn or otherwise misshapen bearing surfaces. The specific refinishing tool herein shown and described is particularly applicable for refinishing crank pin surfaces of V-8 engine crankshafts and the like which do not provide a true guiding surface for aligning the cutting tool during the cutting operation. The present application constitutes a continuation-in-part of my prior copending application Serial No. 56,134 filed September 15, 1960, now abandoned.

The high bearing load imposed on crank pin surfaces adjacent to the connecting rod bearing of internal combustion engines employed in automobiles, auxiliary power plants, and the like frequently causes a wear condition which produces an egg-shaped, tapered, or otherwise misshapen crank pin bearing surface would eventually results in bearing failure. As is frequently the case, only the crank pin bearing surface beneath one or two connecting rod bearings become worn to the extent that they require refinishing and it is most advantageous under such circumstances to refinish the bearing surfaces without having to completely tear down the engine and remove the crankshaft.

A bearing surface reconditioning tool which enables in situ reconditioning of crank pin bearing surfaces is disclosed in United States Patent 2,552,545 issued May 15, 1951, to the same inventor of the present invention. However, the reconditioning tool disclosed in the aforementioned patent is applicable to the refinishing of crank pins on which only one connecting rod is mounted such as on crankshafts of conventional in-line six-cylinder and eight-cylinder engines. The bearing surface conditioning tool disclosed in the above mentioned patent is aligned around the crank pin and guided during the refinishing operation by the unworn portions of the crank pin adjacent to each of the crank arms. The coaction between the refinishing tool and the unworn end portions of the crank pins assures refinishing of the misshapen crank bearing surface to a true round condition concentric with the axis of the crank pin.

The widespread adoption of V-8 type engines in various power applications has presented a further problem in enabling in situ refinishing of worn crank pin bearing surfaces since in the conventional design of V-8 engines, two connecting rods are disposed in side-by-side relationship on each crank pin preventing the use of the unworn edge portion on the crank pin as a means for aligning and guiding the bearing surface reconditioning tool. Accordingly, there has been a heretofore unfilled need for a bearing surface reconditioning tool which can be employed to accurately refinish the bearing surface beneath one connecting rod of a crank pin adapted to support two connecting rods and which tool embodies therein self-aligning features to assure a refinished bearing surface which is true and concentric with the axis of the crank pin.

It is accordingly a primary object of the present invention to provide an improved bearing surface reconditioning tool which can be clamped over the worn and misshapen crank pin bearing surface of a crankshaft incorporating two connecting rods per crank pin or throw and which refinishing tool embodies self-aligning features therein enabling accurate refinishing of the bearing surface without necessitating the tear down of the engine and removal of the crank-shaft therefrom.

The foregoing and other objects of this invention are achieved by a bearing surface reconditioning tool having a cutting head adapted to be pivotally connected to the upper half of a connecting rod and clamped around the bearing surface to be refinished and which cutting head incorporates a cutting blade and a rocker guide disposed in sliding contact with the bearing surface to be refinished. The lateral pivoting movement of the cutting head and the coaction of the rocker guide and bearing surface coupled with the bearing resistance of the connecting rod and cutting resistance of the cutting blade serve to self-align the refinishing tool with the axis of the crank pin enabling accurate refinishing of the misshapen bearing surface in a true cylindrical shape concentric with the axis of the crank pin.

Other objects and advantages of the present invention will become apparent from the following detailed description taken in conjunction with the accompanying drawings, wherein:

FIGURE 1 is a fragmentary side elevation view partly in section of the bearing surface reconditioning tool in an assembled condition constructed in accordance with one embodiment of the present invention mounted on a connecting rod and clamped around a cylindrical bearing surface to be refinished;

FIG. 2 is a fragmentary transverse sectional view taken through the connecting rod and bearing insert shown in FIGURE 1 and taken along line 2—2 thereof;

FIG. 3 is a transverse longitudinal sectional view of the assembly shown in FIGURE 1 and taken along line 3—3 thereof and wherein the crank pin has been omitted for the purposes of clarity;

FIG. 4 is a transverse vertical sectional view of the bearing surface reconditioning tool shown in FIGURE 3 and taken along line 4—4 thereof;

FIG. 5 is a transverse sectional view through the rocker guide and ball support shown in FIGURE 4 and taken along line 5—5 thereof;

FIG. 6 is a transverse sectional view through the fixed guides shown in FIGURE 4 and taken along line 6—6 thereof;

FIG. 7 is a transverse sectional view through the rocker guide and ball support similar to that shown in FIGURE 5 and illustrating the aligning forces acting on the cutting head;

FIG. 8 is a perspective view of a modified version of the cutter blade adapted for use in refinishing bearing surfaces of varying widths;

FIG. 9 is a fragmentary side elevation view partly in section of an alternate satisfactory construction of a bearing surface reconditioning tool shown in an assembled condition and disposed in overlying clamping relationship around a cylindrical bearing surface to be refinished;

FIG. 10 is a transverse vertical sectional view similar to FIG. 4 and illustrating the construction of the bearing surface reconditioning tool shown in FIGURE 9;

FIG. 11 is a transverse vertical sectional view through the rocker guide assembly of the bearing surface reconditioning tool shown in FIG. 10 and taken substantially along the line 11—11 thereof, and FIG. 12 is a fragmentary transverse sectional view through a mounting screw for pivotally mounting the tool on a connecting rod as shown in FIG. 9 and taken substantially along the line 12—12 thereof.

Referring now to the drawings, a bearing surface reconditioning tool constructed in accordance with one embodiment of this invention is comprised of a cutting head 9 including a body member 10 having an arcuate surface 12 which is adapted to overlie the bearing surface to be reconditioned. The body member 10 is adapted to replace the lower cap (not shown) of the connecting rod and is connected to a connecting rod 14 which extends upwardly into the cylinder of the engine. The body member 10 can be formed of an integral, high strength metallic block or may be comprised of two split halves which are rigidly secured together such as by welding, bolting, etc. As shown in the drawings, and particularly FIGURES 3 and 4, the body member 10 includes a cutter blade 16 which is adjustably clamped in a transverse slot of a tool holder 18 by means of a screw 19 having the shank portion thereof extending through a bore 21 through substantially the midpoint of the cutter blade. The transverse alignment of the cutting edge of the cutter blade 16 is adjustably achieved by pivoting the cutter blade about the screw 19 until appropriate alignment is obtained and thereafter maintaining that alignment by a pair of positioning screws 20 extending upwardly and disposed in transverse spaced relationship and in abutting contact with the base of the cutter blade. The cutting edge of the cutter blade 16 projects beyond the arcuate surface 12 of the body member and is adapted to contact the misshapen bearing surface of a crank generally indicated at 22. The tool holder 18 is slidably positioned in a rectangular cavity 24 in the body member 10 and is removably secured therein by means of a cap screw 26. The relative disposition of the tool holder 18 with respect to the base 28 of the cavity 24 is adjustably achieved by a stop set scerw 30 which is threadably engaged in the body member 10 as shown in FIGURE 4 and projects upwardly having its end disposed in abutting relationship with the tool holder 18. Adjustments of the height of the cutting edge of the cutter blade 16 above the arcuate surface 12 is simply achieved by loosening the cap screw 26 and adjusting the stop set screw 30 until the appropriate height adjustment is attained and thereafter tightening the cap screw 26 so as to lock the tool holder 18 in the cavity 24.

The body member 10 is provided with an aperture 32 extending through and disposed in communication with the exterior surface and the arcuate surface 12 providing therewith a chute through which the cutting chips removed from the crank pin 22 during the refinishing operation are disposed.

The arcuate surface 12 and cutter blade 16 are maintained in a minimum spaced relationship from the bearing surface of the crank pin 22 by a rocker guide 34 disposed angularly forwardly of the cutter blade and a pair of fixed guides 36 disposed in spaced transverse relationship and projecting from the arcuate surface 12 at a point spaced angularly rearwardly of the cutter blade 16. The rocker guide 34 and fixed guides 36 serve to regulate the maximum depth of cut of the cutter blade for a given blade adjustment. The rocker 34 is movably mounted on a ball support assembly which enables pivoting movement of the rocker guide in accordance with the contour of the worn bearing surface to be refinished. The pivoting movement of the rocker guide 34 enables lateral pivoting movement of the body member 10 in accordance with the aligning sliding contact thereof against the adjacent connecting rod and crank arm surface and also supplements this aligning tendency by virtue of the ball support assembly. As will be noted in FIGURES 4 and 5 the rocker guide 34 can be provided with a central recess in the projecting portion thereof providing a pair of transversely spaced contacting surfaces 38 which are adapted to slidably contact the bearing surface to be refinished. The sides of the rocker guide 34 as shown in FIGURE 5 are provided with projections 40 which are adapted to contact the sides of radial cavity 42 in the body member 10 in which the rocker guide and ball support assembly is mounted. The coaction of the projections 40 and the side walls of the cavity 42 serve to laterally restrict the movement of the rocker guide 34 without restricting the pivoting movement thereof in a plane transverse to the arcuate surface 12. The maximum pivoting movement of the rocker guide 34 is limited by the coaction of the outward flaring side surfaces 44 of the rocker guide and the chamfer surfaces 46 along the upper edge of the cavity 42 as shown in FIGURE 5. Radial movement of the rocker guide 34 into and out of the cavity 42 is restricted by the coaction of the projecting conical shank portion of a set screw 48 threadably engaged in the body member 10 and projecting into the cavity 42 and an indentation 50 in one of the face surfaces of the rocker guide 34. The base of the rocker guide 34 is provided with a concave spherical seat 52 for receiving and slidably contacting an upper ball 54 of the ball support assembly. The upper ball 54 in turn is firmly seated in a correspondingly contoured seat 56 at the end of a connecting pin 58 which is provided with a concave seat 60 at the other end thereof which overlies and disposed in bearing contact with a lower ball 62. The lower ball 62 is seated on the edge of an aperture 64 extending through the body member 10 and disposed in communication with the cavity 42 at substantially the center portion of the base thereof. As will be noted in FIGURE 4, the upper ball 54, the lower ball 62, and the connecting pin 58 therebetween are of a diameter slightly less than the width of the radial cavity 42 whereby the rocker guide and ball support assembly are maintained in substantially vertical alignment with respect to a transverse plane through the center of the cavity 42. On the other hand, the ball support assembly enables the rocker guide and connecting pin 58 to pivot in a transverse plane as a result of the bearing pressure exerted at the contact surfaces 38 of the rocker guide 34 through the sliding contact thereof with the bearing surface of the crank pin 22. Pivoting of the rocker guide imposes counteracting forces on the cutting head 9 tending to align the reconditioning tool with the longitudinal axis of the crank pin as will be, subsequently, described in detail.

The body member 10 is pivotally connected to the connecting rod 14 at the forward or drag end portion thereof by a latch 66 pivotally mounted on a pivot pin 68 extending transversely through a pair of spaced flanges 70 projecting from the forward end of the body member 10. The engaging upper portion of the latch 66 is provided with a concave seat 72 adapted to overlie a spherical ball mounting 74 secured to one side of the connecting rod 14 by a screw 75. The coaction between the latch 66 and the ball mounting 74 enables lateral pivoting movement of the body member relative to the connecting rod to which it is connected in accordance with the aligning tendency of the tool as will be subsequently described in detail. During the refinishing operation and with the crankshaft rotating in a counterclockwise direction as shown in FIGURE 1, the cutting resistance between the cutter blade 16 and the surface of the crank pin 22 tends to cause the body member 10 to move in a counterclockwise direction as viewed in FIGURE 1 which is counteracted by the latch 66 seated on the spherical ball mounting 74. It should be noted that in order to achieve the self-aligning action of the body member relative to the true longitudinal axis of the crank pin being refinished, it is important that the pulling action at the forward or drag-end portion of the body member be applied or concentrated at a point vertically spaced closer to the parting edge of the body member than the point of contact of the rocker guide 34 or fixed guide 36 with the surface of the crank pin. It is, also, imporant that this pulling action be applied at a point positioned substantially midway between the lateral side surfaces of the body member.

The opposite side of the body member 10 or anti-drag portion thereof is provided with a stepped bore 76 which is adapted to align with the bore in the connecting rod 14 through which a tension screw 78 extends having a bearing nut 80 threadably engaged thereon for clamping the body member around the crank pin 22. The pressure, or force of the cutter blade against the bearing surface of a crank pin 22 is regulated by loosening or tightening the bearing nut 80. As will be noted in FIGURE 3, the stepped bore 76 is of an elliptical configuration enabling longitudinal movement of the tension screw 78 and bearing nut thereon with respect to the body member 10 as occasioned by tightening and loosening the bearing nut and also enables the body member to accommodate connecting rods of different sizes.

In order to provide tangential contact of the connecting rod with the worn or otherwise misshapen bearing surface to be reconditioned, the upper half of a conventional bearing shell is removed from the connecting rod and is replaced with a crowned insert guide 82 having a convex surface as shown in FIGURE 2. Bearing inserts having a flat cylindrical surface can also be satisfactorily employed such as the insert 82a shown in FIGURE 9. The crowned insert guide 82 is provided with side flanges 84 which are firmly clamped against the base of the connecting rod by the screw 75 on one side and a nut 86 on the tension screw 78 at the other side as shown in FIGURE 1.

In a typical refinishing operation of worn crank pin bearing surface, the lower cap of the connecting rod adjacent the worn surface is removed and the bearing shell is removed from the connecting rod. The insert guide 82 is inserted in the connecting rod and secured in place by the screw 75 which simultaneously secures the spherical ball mounting 74 and the tension screw 78 and nut 86. The cutting head of the bearing surface reconditioning tool is clamped around the defective bearing surface by securing the latch 66 on the spherical ball mounting 74 and securing the bearing nut 80 on the threaded shank of the tension screw 78. When in the assembled position the bearing surface reconditioning tool is maintained in appropriate longitudinal position on the crank pin by the sliding coaction of the adjacent connecting rod on one side and the side surface of the crank arm on the other side. The bearing nut 80 is tightened until the contact surfaces 38 of the rocker guide 34, the cutting edge 40 of the cutter blade 16, and one or both of the fixed guides 36 are in firm contact with the bearing surface. In crank pins which are worn in an out-of-round or egg-shaped configuration, the tightening adjustment of the bearing nut is made with the cutter blade positioned at the maximum diameter of the crank pin.

With the bearing surface reconditioning tool installed in accordance with the procedure hereinabove described, a crank pin having substantially parallel surfaces but worn in an out-of-round condition is refinished by rotating the crankshaft at a relatively slow speed, such as, for example, an r.p.m. of about 6 revolutions per minute, wherein the cutter blade removes material along the high spots and passes at relatively low pressure across the low spots of the bearing surface. Periodically the bearing nut is retightened to maintain the appropriate pressure which is reduced as the material at the high spots is removed. Eventually the high spots on the bearing surface are removed whereby the cutter tool contacts the bearing surface of the crank pin at substantially the same pressure along the entire circumference thereof producing a final finish cut which is accurate and producing a refinished surface concentric with the longitudinal axis of the crank pin.

In bearing surfaces which have been worn in an out-of-round condition as well as in a tapered configuration, the sliding coaction between the side edges of the body member 10 and the adjacent connecting rod on one side and the side surface of the crank arm on the other side coupled with the sliding resistance of the connecting rod along the crank pin serves to laterally rock or pivot the cutting head whereby the cutting edge of the cutter blade is moved into cutting relationship with the high side of the taper. This aligning tendency is supplemented by the coaction of the rocker guide 34 and ball support assembly which tends to force the body member and the cutter blade toward a position in which it is substantially parallel to the longitudinal axis of the crank pin so as to remove material from the high side of the taper eventually producing a true cylindrical bearing surface concentric with the longitudinal axis of the crank pin.

The bearing surface reconditioning tool herein described is adaptable for refinishing crank pin bearing surfaces which vary in width as occasioned by different engine designs. Ordinarily, the cutting head is maintained in appropriate longitudinal and laterally tilted disposition on the crank pin by the sliding contact of the adjacent connecting rod on one side, and the crank arm on the other side. To provide angular alignment and positive longitudinal guidance of the cutting head with respect to the bearing surface of a crank pin which is substantially wider than the cutting head, alternate cutter blades such as the one shown in FIGURE 8 can be employed which has a cutting edge of a length equal to the width of the bearing surface to be refinished and is provided with guide lugs 94 projecting from the sides thereof which are adapted to contact the adjacent connecting rod on one side and the side surface of the crank arm on the other side. This sliding coaction exerts a force at the cutting head at a point along the lowermost portion of the body member which applies a lateral tilting movement to the body member about the connections along the drag and anti-drag ends thereof tending to align the cutting edge of the blade with the true axis of the crank pin. By using a plurality of cutter blades which deviate in the length of their cutting edges and the projecting distance of the guide lugs thereon, the bearing surface reconditioned tool comprising the present invention can be simply adapted to refinish misshapen bearing surfaces of a wide variety of commercial engines.

The supplementary self-aligning tendency of the rocker guide 34 of the refinishing tool can be best described with reference to FIGURES 5 and 7. In FIGURE 5 the bearing surface of the crank pin 22 on which the rocker guide 34 is slidably disposed and in bearing contact is parallel to the center line of the crank pin axis. In such a condition the center of the rocker guide 34, the upper ball 54, the connecting pin 58, and the lower ball 62 are all disposed in substantial vertical alignment as shown in FIGURE 5 whereby the bearing reaction between the contact surfaces 38 of the rocker guide is transmitted substantially perpendicularly to the bearing surface of the crank pin through the vertically aligned ball supporting assembly resulting in a radial reaction force that has no axial component tending to rock the body member 10 about an axis transverse to the axis of the bearing surface. In this condition, no lateral tilting movement is applied to the body member 10 by the coaction thereof or guide lugs 94 on the cutter blade with the adjacent connecting rod or side surface of a crank arm and the body member accordingly, is disposed in alignment with the axis of the connecting rod.

It is otherwise, however, when the rocker guide 34 is disposed in sliding bearing contact with a crank pin 22 having a tapered bearing surface wihch causes the rocker guide 34 to pivot to the position shown in phantom in FIGURE 7 whereby the upper ball 54 and the connecting pin 58 are moved out of vertical alignment. The direction of the reaction forces applied to the rocker guide and transmitted through supporting ball assembly are indicated by the arrows in FIGURE 7. The bearing force applied against the rocker guide 34 is transmitted through substantially the center thereof and acts at the center of the upper ball 54 as indicated by the arrow 88. The force applied to the upper ball is transmitted therefrom through the connecting pin 58 to the lower ball 62 in a direction indicated by the arrow 90 which in turn transmits the force thereon to the edges of the aperture 64 in which it is seated. Due to the misalignment of the forces indicated by the arrows 88 and 90 a resultant pivoting force is imposed on the body member 10 tending to cause the body member to pivot in a clockwise direction as viewed in FIGURE 7 and indicated by the arrow 92. This force urges the cutting blade against the high side or larger diameter portion of the tapered bearing surface to be refinished causing a more rapid removal of material from this side. As the refinishing process continues the taper of the crank pin progressively decreaess wherein the misalignment between the rocker guide and ball support assembly decreases approaching substantial vertical alignment as depicted in FIGURE 5 when a true cylindrical surface is obtained. It will be appreciated that the magnitude of the force tending to align the body member 10 increases as the distance between the point of contact of the rocker guide with the crank pin bearing surface and the point of contact of the lower ball 62 with the body member 10 is increased thereby providing increased leverage tending to pivot the body member toward true alignment with the axis of the crank pin. The tendency of the cutting head to pivot toward the high side of the taper through the self-aligning feature hereinabove described serves to apply an increased pressure to the edge of the cutter blade adjacent the high side of the tapered bearing surface causing positive removal of material therealong thereby reducing the degree of taper with each revolution of the crankshaft. It will, also, be noted that in crank pins having a worn tapered configuration generally only one of the fixed guides 36 contacts the bearing surface to be refinished along the high side of the taper. As the taper is reduced the second fixed guide eventually also contacts the bearing surface further aiding in the guidance of the cutting head and the cutter blade therein relative to the bearing surface.

The primary self-aligning action during the refinishing of worn, tapered bearing surfaces is provided by a side force resulting from the bearing coaction between the projecting end of the cutter blade or body member against the side edge of an adjacent connecting rod on one side or the face surface of a crank arm on the opposite side. This side force or thrust tends to cause the cutting head to pivot so as to move the cutting edge of the cutter blade thereon toward a position wherein it is disposed substantially parallel to the true longitudinal axis of the crank pin. This aligning action is supplemented by the rocker guide 34 and the combination of aligning forces effects a progressive removal of metal from the high side of the taper resulting, finally, in a true cylindrical surface the axis of which is perpendicular to the faces of the crankshaft.

An alternate satisfactory bearing surface reconditioning tool is shown in FIGURES 9 through 12 incorporating an alternate construction of a rocker guide assembly and connecting linkage for pivotally securing the body member to a connecting rod. Similar components of the bearing surface reconditioning tool shown in FIGURES 9 through 12 to the bearing surface reconditioning tool shown in FIGURES 1 through 8 are designated by like numerals having the suffix letter "a" affixed thereto. The construction of the bearing surface reconditioning tool described and shown in FIGURES 9 through 12 is effective to accurately refinish misshapen bearing surfaces by virtue of the principles of the self-aligning structure incorporated therein and operative in a manner hereinbefore described.

The bearing surface reconditioning tool shown in FIGURES 9 through 12 comprises a cutting head 9a including a body member 10a provided with an arcuate surface 12a which is disposed in overlying relationship about a crank pin indicated at 22a. A cutter blade 16a is adjustably clamped in a tool holder 18a adjustably mounted in the body member 10a by means of positioning screws 20a, a stop set screw 30a, and a cap screw 26a. The cutter blade 16a is pivotally mounted in the tool holder 18a by means of a screw 19a extending through a bore 21a through substantially the midpoint of the blade. Appropriate adjustment of the cutting edge of the cutter blade relative to the arcuate surface 12a is achieved in a manner similar to that hereinbefore described.

Disposed angularly forwardly of a chip chute 32a through the body member 10a is a radial cavity 42a in which a rocker guide 34a is disposed which is provided with a transverse contact surface 38a adapted to be positioned in bearing contact against a bearing surface to be reconditioned. The rocker guide 34a is rockably mounted on a ball support assembly enabling transverse pivoting movement of the rocker guide in a manner as hereinbefore described.

The ball support assembly as best shown in FIGURES 10 and 11 comprises a lower ball 62a which is seated on the edge of an aperture 64a extending through the body member 10a and disposed in communication with the cavity 42a at substantially the center of the base thereof. A connecting pin 58a is provided with a spherical concave seat 60a which is disposed in bearing contact against the upper surface of the lower ball 62a. The base portion of the connecting pin 58a is of a width corresponding substantially to the width of the radial cavity 42a whereby the connecting pin is maintained in appropriate radial alignment and while concurrently enabling transverse rocking movement thereof.

The upper shank portion of the connecting pin 58a is of a reduced diameter and is disposed in clearance relationship within a bore 100 extending upwardly from the base of the rocker guide 34a to a point spaced from the contact surface 38a thereon. The bore 100 as shown in FIGURES 10 and 11 extends centrally through the rocker guide 34a. The upper end portion of the connecting pin 58a is provided with a spherical concave seat 56a which is disposed in overlying bearing contact with an intermediate ball 102 having a diameter substantially corresponding to that of the bore 100. The intermediate ball 102 in turn is disposed in bearing contact with an upper ball 104 seated in the base of the bore 100. The bearing contacting relationship between the lower ball 62a, the concave seats of the connecting pin 58a, the intermediate ball 102 and the upper ball 104 provides for transverse pivoting movement of the rocker guide 34a in a manner similar to that hereinbefore described in connection with the rocker guide 34 shown in FIGURES 1 through 8.

The rocker guide 34a is provided with a pair of transverse bores 106 disposed in communication with the bore 100 and with the side surfaces of the upper ball 104 as is best seen in FIGURE 11. A spacer pin 108 is positioned in each of the transverse bores 106 having the inner end surfaces thereof disposed in bearing contact against opposite side surfaces of the upper ball 104 and the other end portions thereof disposed in sliding bearing contact against the side walls of the radial cavity 42a. The coaction between the spacer pins 108 and the side walls of the radial cavity 42a serves to maintain the rocker guide 34a in appropriate transverse alignment relative to the body member 10a while concurrently enabling the rocker guide 34a to pivot or rock in a transverse plane.

Radial movement of the rocker guide 34a into and out of the cavity 42a is restricted by the coaction of the inward projecting shank portions of a pair of screws 110 adjustably and threadably engaged in the body member 10a and positioned in alignment with a notch or slot 112 along each of the lower side edges of the rocker guide 34a. Sufficient clearance is provided between the slots 112 and the end portions of the screws 110 to provide unrestricted pivoting movement of the rocker guide 34a through an angularity as encountered in the reconditioning of misshapen bearing surfaces. With the rocker guide 34a disposed in a position as shown in FIGURE 11, the bearing thrust of the crank pin 22a against the contact surface 38a of the rocker guide 34a is transmitted through the ball assembly to the edge of the bore 64a on which the lower ball 62a is seated effecting thereby an opposing rocking movement of the body member 10a and the cutter blade thereon in a manner as hereinbefore described.

An alternate satisfactory connecting linkage is shown in FIGURES 9, 10 and 12 for pivotally connecting the forward or drag end portion of the body member 10a to a connecting rod 14a, to enable lateral rocking movement thereof and the cutter blade thereon consistent with the misshapen contour of the surface of the crank pin 22a. The body member 10a at substantially the midpoint of the drag end portion thereof is formed with a slot generally indicated at 114 forming therewith a pair of spaced ears 116, which are provided with a rectangular shaped groove 118 extending across the inward faces thereof and disposed in opposing aligned relationship. A washer 120 having a diameter slightly less than the distance between the base of the grooves 118 is slidably positioned and disposed in bearing contact against the shoulders of the grooves 118 as may be best seen in FIGURE 12. The washer 120 is provided with a bore therethrough disposed in communication with a conical concave seat 122 against which a complementarily contoured surface on the underside of a head 124 of a connecting screw 126 is slidably seated in bearing contact. The upwardly projecting threaded shank portion of the screw 126 extends through a bore in the connecting rod 14a on the projecting end of which a clamping nut 128 is threadably secured. By virtue of this construction, the cutting resistance created during a refinishing operation is transmitted from the cutter blade 16a to the body member 10a, through the washer 120 and thence through the screw 126 to the connecting rod 14a. The coaction between underside of the head 124 and the conical seat 122 enables unrestricted lateral rocking movement of body member 10a relative to the connecting rod 14a as a result of the aligning action provided by the sliding coaction of the lower side edges of the body member 10a against the connecting rod on one side and the crank arm on the other and the supplementary aligning action of the rocker guide 34a. It will also be noted that the point of contact between the conical seat 122 and the head 124, is positioned in closer between the conical seat 122 and the head 124, is positioned in closer vertically spaced relationship to the parting surface of the body member 10a than is the point of sliding bearing contact of the surface 38a of the rocker guide 34a against the surface of the crank pin.

The opposite side of the body member 10a is adjustably clamped to the connecting rod 14a by means of a bearing nut 80a disposed in adjustable threaded engagement on the shank of a tension screw 78a in a manner as hereinbefore described in connection with FIGURES 1 through 8. An alternate form of an insert guide 82a is shown in FIGURE 9 having only one side flange 84a which is firmly clamped against the base of the connecting rod 14a by a nut 86a on the tension screw 78a. The other end of the insert guide 82a extends arcuately around the concave surface of the connecting rod 14a and terminates at a point spaced from the parting face thereof.

The bearing surface reconditioning tool shown in FIGURES 9 through 12 is installed around a misshapen crank pin to be reconditioned in a manner similar to that hereinbefore described. The washer 120 disposed on the head of the connecting screw 126 is first positioned within the grooves 118 as shown in FIGURES 10 and 12 and thereafter the bearing nut 80a is tightened until the contact surface 38a of the rocker guide 34a, the cutting edge of the cutter blade 16a, and one or both of the fixed guides 36a are in firm contact with the bearing surface. Subsequent adjusting of the bearing nut 80a during the finishing operation as occasioned by the progressive removal of metal from the crank pin is accomplished in the same manner as hereinbefore described. The aligning forces transmitted to the body member 10a through the rocker guide 34a and ball support assembly as well as the lateral thrust applied to the body member by the sliding coaction of the cutting head against the adjacent connecting rod or crank arm is effective to cause the cutting edge of the cutter blade 16a to refinish the misshapen bearing surface in a true, concentric and cylindrical configuration coinciding with the longitudinal axis of the crank pin which is disposed perpendicular to the faces of the crankshaft.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A bearing surface reconditioning tool comprising a cutting head including a body member having an arcuate surface adapted to overlie a portion of the bearing surface to be reconditioned, a cutter blade adjustably mounted in said body member and projecting above and extending transversely of said arcuate surface, a first guide means movably mounted in said body member and projecting above and transversely of said arcuate surface and angularly disposed forwardly of said cutter blade, said first guide means adapted to contact the bearing surface and maintain the forward portion of said arcuate surface in appropriate spaced relationship thereto, movable supporting means pivotally mounting said first guide means in a plane axially of said arcuate surface, a second guide means on said body member projecting above said arcuate surface at a position angularly spaced rearwardly of said cutter blade and adapted to maintain the rearward portion of said arcuate surface in appropriate spaced relationship from the bearing surface, and means for adjustably clamping said cutting head over the bearing surface to be reconditioned.

2. The bearing surface reconditioning tool according to claim 1 further characterized by the fact that said cutter blade is provided with a guide lug projecting from each end thereof beyond the sides of said body member.

3. A bearing surface reconditioning tool comprising a cutting head including a body member having an arcuate surface adapted to overlie a portion of the bearing surface to be reconditioned, a cutter blade adjustably mounted in said body member having the cutting edge thereof projecting above and extending transversely of said arcuate surface, a rocker guide movably mounted in said body member and disposed in angularly spaced relationship forwardly of said cutter blade, said rocker guide including a pair of spaced contact surfaces disposed transversely of said arcuate surface and adapted to slidably contact the bearing surface and maintain the forward portion of the arcuate surface in appropriate spaced relationship thereto, a ball support assembly in said body member for movably supporting said rocker guide and enabling pivoting movement thereof in a plane transverse to said arcuate surface, said ball support assembly including a connecting pin movably disposed in said body member along said plane of said rocker guide and having one end thereof supporting said rocker guide and the other end thereof supported by said body member, a fixed guide on said body member projecting above said arcuate surface at a position angularly spaced rearwardly of said cutter blade for maintaining the rearward portion of said arcuate surface in appropriate spaced relationship from the bearing surface, and means for adjustably clamping said cutting head over the bearing surface to be reconditioned.

4. A bearing surface reconditioning tool comprising a cutting head including a body member having an arcuate surface adapted to overlie a portion of the bearing surface to be reconditioned and defining a drag end portion adjacent one end of said arcuate surface and an anti-drag end portion adjacent to the opposite end of said arcuate surface, a cutter blade adjustably mounted in said body member having the cutting edge thereof projecting above and extending transversely of said arcuate surface, first guide means on said body member projecting above and transversely of said arcuate surface and angularly disposed forwardly of said cutter blade toward said drag end portion of said body member, second guide means on said body member projecting above said arcuate surface at a position angularly spaced rearwardly of said cutter blade toward said anti-drag end portion of said body member and adapted to maintain the rearward portion of said arcuate surface in appropriate spaced relationship from the bearing surface, first clamping means positioned at said drag end portion of said body member for pivotally securing said cutting head with said drag-end portion disposed in spaced relationship to one edge of a connecting rod providing for lateral tilting movement of said cutting head relative to a connecting rod, and second clamping means on said anti-drag end portion of said body member for pivotally and adjustably securing said cutting head in spaced relationship to the other side of a connecting rod.

5. A bearing surface reconditioning tool comprising a cutting head including a body member having an arcuate surface adapted to overlie a portion of the bearing surface to be reconditioned, a cutter blade adjustably mounted in said body member having the cutting edge thereof projecting above and extending transversely of said arcuate surface, a rocker guide movably mounted in said body member and disposed in angularly spaced relationship forwardly of said cutter blade, said rocker guide including a contact surface disposed transversely of said arcuate surface and adapted to slidably contact the bearing surface and maintain the forward portion of the arcuate surface in appropriate spaced relationship thereto, a ball support assembly in said body member for pivotally mounting said rocker guide in a plane axially of said arcuate surface, a fixed guide on said body member projecting above said arcuate surface at a position angularly spaced rearwardly of said cutter blade for maintaining the rearward portion of said arcuate surface in appropriate spaced relationship from the bearing surface, and clamping means for adjustably and pivotally clamping said cutting head over the bearing surface to be reconditioned including a latch pivotally mounted on the body member adjacent to said forward portion of said arcuate surface having a concave seat at one end thereof which is adapted to be positioned in overlying seating relationship on a spherical mounting projection on a connecting rod, and screw means on the opposite end portion of said body member adjacent to said rearward portion of said arcuate surface for adjustably clamping said body member to the other side of a connecting rod.

6. A bearing surface reconditioning tool comprising a cutting head including a body member having an arcuate surface adapted to overlie a portion of the bearing surface to be reconditioned, a cutter blade adjustably mounted in said body member having the cutting edge thereof projecting above and extending transversely of said arcuate surface, a rocker guide movably mounted in said body member and disposed in angularly spaced relationship forwardly of said cutter blade, said rocker guide including a contact surface disposed transversely of said arcuate surface and adapted to slidably contact the bearing surface and maintain the forward portion of the arcuate surface in appropriate spaced relationship thereto, a ball support assembly in said body member for pivotally mounting said rocker guide in a plane axially of said arcuate surface, a fixed guide on said body member projecting above said arcuate surface at a position angularly spaced rearwardly of said cutter blade for maintaining the rearward portion of said arcuate surface in appropriate spaced relationship from the bearing surface, and clamping means for adjustably and pivotally clamping said cutting head to a connecting rod and over a bearing surface to be reconditioned including conical seating means positioned in said cutting head adjacent to said forward portion of said arcuate surface and screw means having a complementarily shaped head portion adapted to be positioned in sliding seating relationship in said seating means and extending into connecting relationship with one end of a connecting rod, and screw means at the opposite end portion of said cutting head adjacent to siad rearward portion of said arcuate surface coacting with the opposite side of a connecting rod for adjustably securing said cutting head to a connecting rod.

7. A bearing surface reconditioning tool for refinishing misshapen cylindrical surfaces of the type wherein flat wall defining portions are located adjacent to the axially spaced ends of and perpendicular to the true longitudinal axis of such surface comprising a tool holder shaped to extend angularly around a portion of surface and including a cutter blade having the cutting edge thereof disposed transversely of said tool holder, means for mounting said tool holder in overlying relationship over such surface and with said cutter blade thereof disposed against unwanted angular movement about the longitudinal axis of such surface while permitting angular movement of said tool holder about an axis perpendicular to said longitudinal axis, and guide means on said tool holder including portions engageable with the wall defining portions.

8. A bearing surface reconditioning tool for refinishing misshapen substantially cylindrical surfaces on a crankshaft or the like while the crankshaft is rotatably mounted with respect to fixed adjacent supporting portions comprising a tool holder shaped to extend angularly around a portion of such surface and including a cutter blade having the cutting edge thereof disposed transversely of said tool holder, securing means for attaching the holder to such supporting portions and preventing unwanted movement of the tool holder about the longitudinal axis of said surface while permitting angular movement of the tool holder about an axis transverse to said longitudinal axis.

References Cited in the file of this patent

UNITED STATES PATENTS

| | | |
|---|---|---|
| 1,560,152 | Ellis | Nov. 3, 1925 |
| 2,133,192 | Foster | Oct. 11, 1938 |
| 2,162,187 | Tharp | June 13, 1939 |
| 2,219,245 | Zitzerman | Oct. 22, 1940 |
| 2,329,806 | Wilson | Sept. 21, 1943 |
| 2,453,797 | Johnson | Nov. 16, 1948 |
| 2,507,846 | Zitzerman | May 16, 1950 |
| 2,520,025 | Beck | Aug. 22, 1950 |
| 2,552,545 | Engel | May 15, 1951 |
| 2,860,539 | Davies | Nov. 18, 1958 |